United States Patent [19]

Maine

[11] 4,344,041
[45] Aug. 10, 1982

[54] BIPHASE DETECTOR

[75] Inventor: Reuben E. Maine, Charlottesville, Va.

[73] Assignee: Sperry Corporation, New York, N.Y.

[21] Appl. No.: 239,084

[22] Filed: Feb. 27, 1981

[51] Int. Cl.$^3$ .............. H03D 3/18; H03K 9/00; H04L 27/22

[52] U.S. Cl. .................. 329/50; 329/104; 329/122; 375/87; 331/23

[58] Field of Search ........... 375/55, 56, 84, 87; 329/50, 104, 105, 107, 122–124; 360/40, 43, 51; 371/47; 331/23

[56] References Cited

U.S. PATENT DOCUMENTS

| | | | |
|---|---|---|---|
| 3,991,378 | 11/1976 | Schaefer | 329/104 X |
| 4,167,760 | 9/1979 | Decker | 375/87 X |
| 4,281,292 | 7/1981 | Caldarella et al. | 329/104 X |

*Primary Examiner*—Siegfried H. Grimm
*Assistant Examiner*—Edward P. Westin
*Attorney, Agent, or Firm*—Howard P. Terry

[57] ABSTRACT

The binary state of each cycle of a biphase modulated input signal is detected by a "D" flip-flop when it is clocked by a locally-generated reference signal. When the binary state of the input signal has a first value at clocking, the reference signal is passed through a first exclusive OR gate unchanged. When the binary state of the input signal has the opposite value, the reference signal is inverted by the same OR gate. The output of the first OR gate and the input signal are applied to a second exclusive OR gate to provide a pulse train having a duty cycle indicative of the phase error between the input signal and the reference signal. The latter pulse train is filtered and used to adjust the phase of the reference oscillator until the phase error is eliminated and the circuit is in balance. The binary state of the flip-flop is indicative of the binary state of the input signal.

8 Claims, 4 Drawing Figures

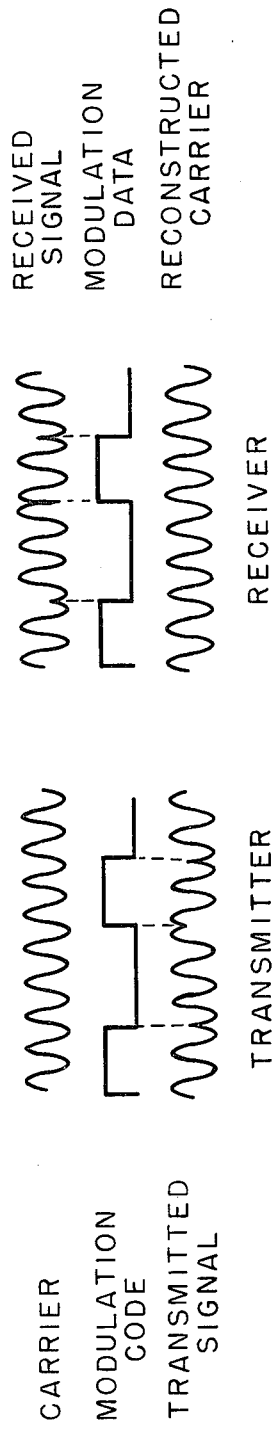
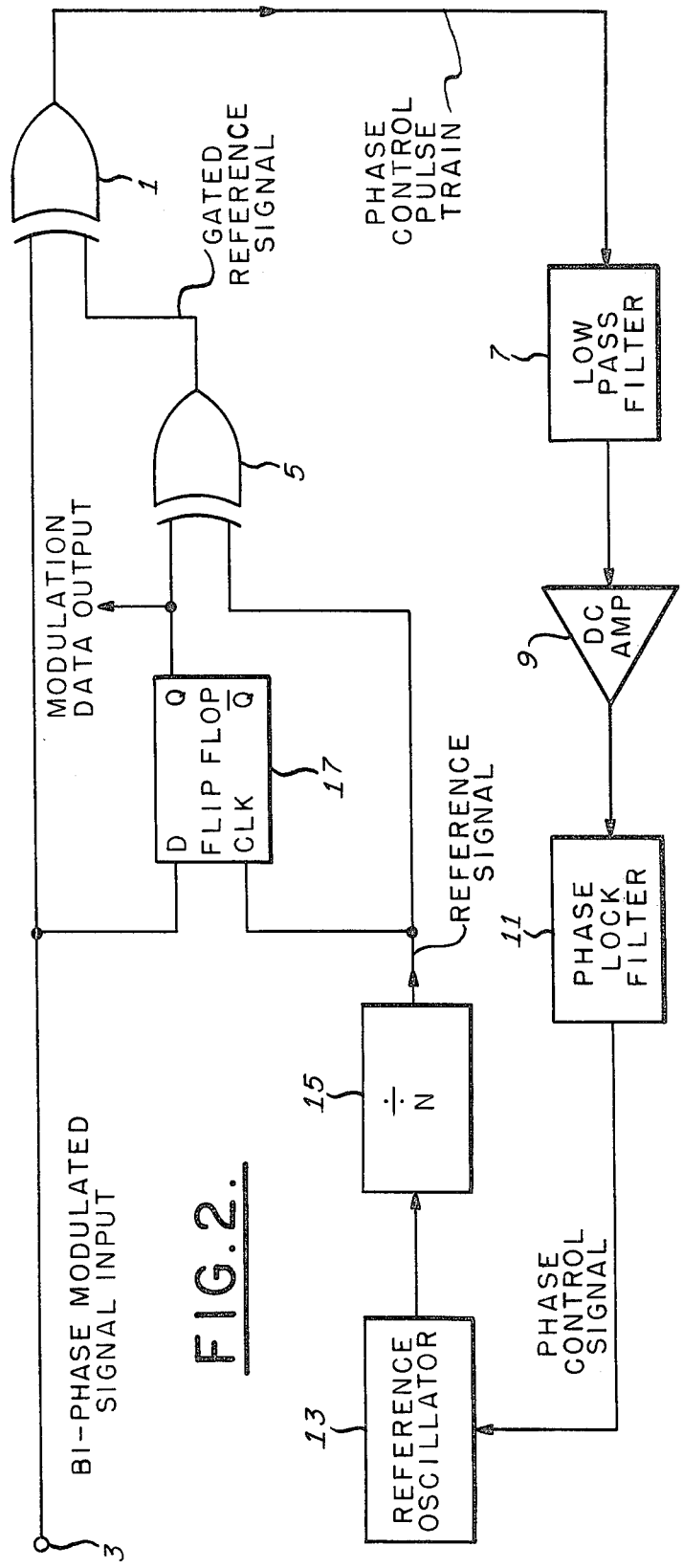

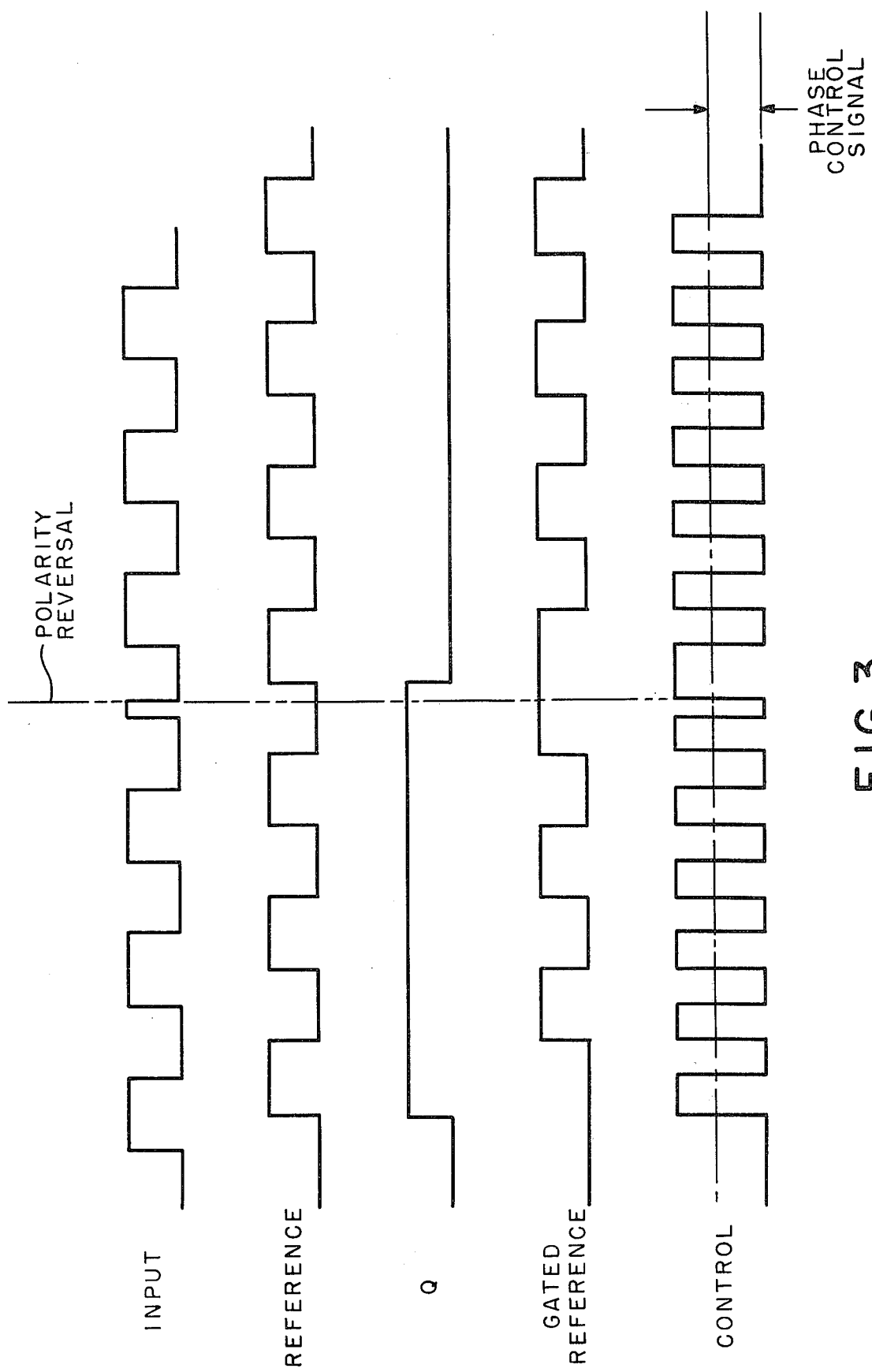

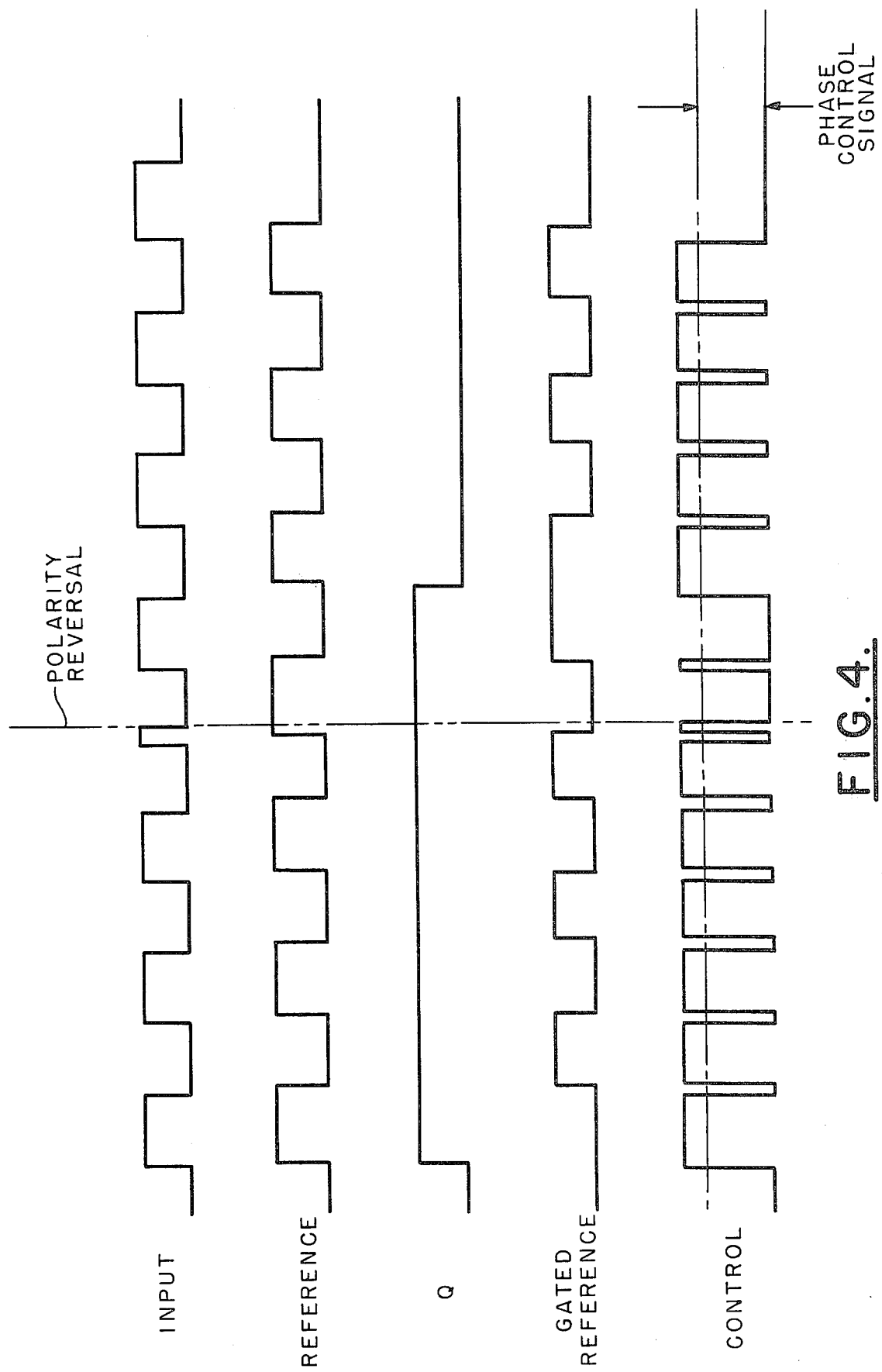

BIPHASE DETECTOR

BACKGROUND OF THE INVENTION

1. Field of the Invention

The present invention relates to demodulation circuits for use in direct sequence modulation systems and, more specifically, to demodulation circuits for use in biphase balanced modulation systems.

2. Description of the Prior Art

Direct sequence modulation systems are known in the art. In such systems, an RF carrier signal is modulated by a digital code sequence whose bit rate is much higher than the information signal bandwidth. One of the preferred modulation formats for such systems is the biphase balanced modulation scheme in which the carrier is transmitted with one phase when the code sequence is a binary ONE and with a 180° phase shift when the code is a binary ZERO.

Various techniques for detecting biphase modulated signals are known. In general, such techniques are coherent processes requiring that the receiver include a local code reference that is an accurate estimate of the received code modulation. Prior art techniques for providing this local code reference are effective but require relatively complex circuitry.

One of the better known demodulators for this type of system, for instance, is the Costas loop, as described in the book: "Spread Spectrum Systems" by R. C. Dixon and published by John Wiley & Sons, New York, in 1976. However, Costas loops are relatively complicated in that they require a pair of demodulators in phase quadrature with each other. When the loop is phase locked, one of the demodulators will be in quadrature with the incoming signal and its output will be basically zero. The reference associated with the other demodulator will demodulate the signals at the maximum value, which may be either positive or negative, depending upon the instantaneous phase of the modulation. Typically, the incoming signal is integrated for a period of one bit, after which time the output of the demodulator which is in phase with the signal is sensed to determine if it is positive or negative, whereupon either the direct or inverted error signal may be used. Thus the Costas loop typically requires integrated dump circuitry, decision making circuitry, and means for inverting the error signal.

In contrast, the circuit of the present invention typically requires only a phase-lock loop, a flip-flop, and an exclusive OR gate.

SUMMARY OF THE INVENTION

A pulse train representative of a received biphase modulated signal is applied to a flip-flop which is clocked by an internally generated reference pulse train so that the state of the flip-flop is switched when the binary state of the input signal is reversed. The output of the flip-flop is applied to a gating means so as to selectively invert reference pulses whenever the output of the flip-flop is at a high level and thus produce a gated reference pulse train having a phase relationship with respect to the input signal that is independent of the binary information being received. The phases of the input signal and the gated reference signal are compared to provide a phase control signal that controls the local oscillator so as to maintain phase quadrature between the reference signal and the input signal. Modulation data output signals are taken from the output of the flip-flop.

BRIEF DESCRIPTION OF THE DRAWINGS

FIG. 1 illustrates waveforms normally encountered in biphase modulation systems;

FIG. 2 is a block diagram illustrating the presently preferred embodiment of the invention; and FIGS. 3 and 4 are waveforms helpful in explaining the operation of the invention.

DESCRIPTION OF THE PREFERRED EMBODIMENT

FIG. 1 illustrates waveforms encountered in a typical biphase modulation system. A carrier wave, generated in the transmitter, is modulated in accordance with the modulation code. As can be seen, the carrier is transmitted with one phase when the code sequence is at a high level and with the opposite phase when the code sequence is at a low level. In the receiver, the carrier signal is reconstructed in accordance with modulation data developed by a demodulator circuit in the receiver.

The present invention is concerned with an improved demodulator for producing an error signal for a phase locking circuit and a modulation data pulse train of the type depicted in FIG. 1.

As depicted in FIG. 1, the received signal consists essentially of a sine wave whose phase is abruptly reversed in accordance with the modulation code developed in the transmitter. Typically, the received wave is converted into rectangular pulses by conventional techniques before being applied to the circuit of the invention. For ease of understanding, the signal input to the circuit of FIG. 2 will be illustrated as a square wave train having a pulse repetition rate equal to the frequency of the received signal.

Referring now to FIG. 2, a demodulator circuit constructed in accordance with the principles of the present invention includes a first exclusive OR gate 1, having one of its input terminals connected to receive biphase modulated signals applied to an input terminal 3, and the other input terminal connected to receive gated reference signals from a second exclusive OR gate 5 as will be described in detail. The output of gate 1, which consists of a unipolar pulse train, is passed through a low pass filter 7, a d.c. amplifier 9, and a conventional phase lock filter 11. In accordance with known phase lock loop principles the output voltage from the phase lock filter is essentially a d.c. voltage having a magnitude indicative of the phase differential between the individual pulse trains applied to the two input terminals of the gate 1. Oscillator 13 is a conventional voltage controlled oscillator that provides a reference pulse train at the output of the frequency divider 15 which has a repetition rate equal to that of the biphase modulated input signal when the phase control voltage from the phase lock filter 11 has a specified magnitude.

In accordance with standard phase lock loop techniques, the reference pulses are in time quadrature with the input pulses when the circuit is operating normally. The reference signal is applied to the clock terminal of a D flip-flop 17 and to the exclusive OR gate 5. The D terminal of the flip-flop is connected to receive input signals and the Q output terminal of the flip-flop is connected to the second input terminal of the gate 5.

In brief, the flip-flop detects the polarity of each cycle of the input signal when it is clocked by the reference signal, thereby functioning as an input signal phase detecting means. The exclusive OR gate 5 serves to selectively invert reference pulses in accordance with the phase of the received signal. The exclusive OR gate 1 cooperates with the loop filters and the amplifier to produce a phase control signal proportional to the phase error between the input signal and reference signal pulse trains. The operation of the invention can be understood by referring to the block diagram shown in FIG. 2 in conjunction with the waveforms shown in FIGS. 3 and 4.

Consider first, the condition depicted in FIG. 3 wherein the pulses in the reference pulse train are in quadrature with the pulses in the input pulse train so that the circuit is operating in its nominal or balanced condition. FIG. 3 further illustrates conditions in the demodulator circuit when the input signal reverses polarity.

It will be appreciated that the individual pulses in the input pulse train correspond to half cycles of sinusoidal voltage in the received signal and the Q signal represents the modulation data output from the flip-flop 17. The "reference" wavetrain represents the signal appearing at the output of the divider 15, the "gated reference" represents a signal appearing at the output of the gate 5 and the "control" wavetrain represents the signal appearing at the output of the gate 1.

As a matter of convenience, the conditions depicted in the left hand side of FIG. 3 may be considered to represent a binary ONE and the conditions depicted to the right of the "polarity reversal" may be considered to represent a binary ZERO.

The leading edge of the first reference pulse occurs when the input signal is at a high level and thus clocks the flip-flop to produce a high level signal at the Q output terminal. Since both the reference and the Q signal are now at a high level, the exclusive OR gate 5 provides a low level gated reference signal. However, since the input signal is at a high level, a high level control signal is produced by the exclusive OR gate 1. This condition persists until the termination of the first input pulse when the control signal drops to a low level because there is no input to the gate 1.

The termination of the first reference pulse does not affect the flip-flop and the Q output remains at a high level. Since the gate 5 now receives a high level signal at only one of its terminals, a gated reference is initiated at this time. Furthermore, since the input signal applied to the gate 1 is at a low level whereas the gated reference is at a high level, a high level control signal is initiated at this time. The high level control pulse persists until the inception of the second input pulse, at which time high level signals are applied to both input terminals of the gate 1 and the output of that gate falls to a low level.

This chain of events repeats itself until a polarity reversal occurs in the input signal. For the conditions depicted in FIG. 3, the polarity reversal occurs when the input signal is at a high level. The high level input pulse is prematurely terminated but the gated reference signal remains at a high level since the flip-flop is not affected, whereby the Q output remains at a high level. The high level gated reference signal now passes through the gate 1 and restores the control signal to a high level.

It will be noted that after the polarity reversal, the positive-going or leading edges of the reference pulses occur when the input pulse train is at a low level whereas the positive-going edges of the reference pulses occurred when the input pulse train was at a high level prior to the polarity reversal. Thus the flip-flop 17 serves to detect the binary state of the input pulse train at each positive-going transition or leading edge of the reference pulse train. If the leading edge of a reference pulse occurs when the input signal is at a high level, a high Q signal is generated. This high Q signal persists until the leading edge of a subsequent reference pulse occurs when the input signal is at a low level whereupon the flip-flop 17 is switched and the Q output drops to a low level.

Referring again to FIG. 3, for example, the Q voltage remains at a high level until the polarity reversal occurs. Shortly after the polarity reversal, the reference signal switches to a high level, the flip-flop 17 effectively detects a low level input signal and the Q output drops to a low level. Since the leading edges of each of the subsequent reference pulses depicted in FIG. 3 occur when the input signal is at a low level, the Q signal remains at a low level throughout the entire interval.

Consider now the action of the OR gate 5 in response to the polarity reversal depicted in FIG. 3. When the polarity reversal occurs, the reference signal is at a low level. However, the Q voltage remains at a high level so that the gated reference signal is unaffected at this time. Shortly thereafter, the leading edge of the next reference pulse switches the flip-flop 17 and the Q output voltage drops to a low level. At the termination of the same reference pulse, both voltages applied to the gate 5 are at a low level so that the gated reference signal from the gate 5 also drops to a low level. For the remainder of the interval, the gated reference signal rises and falls in synchronism with the corresponding changes in the reference signal.

Reference to FIG. 3 reveals the fact that for the conditions depicted before the polarity reversal, the gated reference signal and the reference signal are 180° out-of-phase, whereas the same signals are in-phase subsequent to the polarity reversal. Furthermore, the modulation data output signal Q remains at a high level throughout the interval prior to the polarity reversal and at a low level during the interval following the polarity reversal.

It will be recalled that the present invention is intended to operate in a biphase balanced modulation system in which the carrier, and therefore the input signal depicted in FIG. 3, is transmitted with one phase when the code sequence is a binary ONE and with a 180° phase shift when the code is a binary ZERO. Thus if the conditions depicted prior to the polarity reversal in FIG. 3 represent the transmission of a binary ONE, the conditions depicted subsequent to the polarity reversal in the same figure would represent the transmission of a binary ZERO and the modulation data output signal Q would have high and low values, respectively for these two conditions.

In effect, the OR gate 5 serves as a selective pulse inversion means wherein the pulses in the reference pulse train are inverted and applied to the OR gate 1 when the input signal arises from the transmission of a signal having a first binary value and wherein the gate 5 serves to apply the reference signal directly to the gate 1 when the input signal arises from the transmission of a signal having the opposite binary value.

The formation of the pulses in the phase control pulse train subsequent to the polarity reversal proceeds in the same manner as that already described with respect to the same pulses before the polarity reversal.

It will be recalled that FIG. 3 depicts conditions when the circuit of the invention is in balance so that the reference signal is in phase quadrature with the input signal regardless of the binary value of the signal being transmitted. Under these conditions, the phase control pulse train has a duty cycle of 50% and the resulting d.c. phase control signal applied to the reference oscillator 13 has an average value that maintains the phase of the output signal from the oscillator 13 at its "balanced" value.

Transitory disruption of the duty cycle incident to a polarity reversal ordinarily is not significant in altering the level of the frequency control signal. However, in situations where such disruption is to be minimized, the repetition rate of the reference pulse train can be doubled so that transition intervals can be significantly reduced.

FIG. 4 represents conditions when the circuit is unbalanced and the reference signal is no longer in phase quadrature with the input signal. Under these conditions, the various pulse trains are formed in the same manner as those appearing in FIG. 3. The major difference arises in that the duty cycle of the control pulse train is no longer 50%. Under the conditions depicted in FIG. 4, the reference pulse train has been advanced with respect to the input pulse train. Since the gated reference signal is synchronized with the reference signal, the gated reference is also advanced with respect to the input signal under these conditions.

It will be recalled that a high level control signal is produced when either one, but not both of the input and gated reference signals is at a high level. Thus, as depicted in FIG. 4, the control pulse train initially rises to a high level in response to the first input pulse. At the termination of the first input pulse, the control signal reverts to a low level since there is no gated reference pulse at that time. However, the control pulse signal soon returns to a high level in response to the occurrence of the first gated reference signal and remains at that level until the inception of the second input signal which occurs during the existence of the gated reference signal. This pattern of events is repeated until the occurrence of the polarity reversal in the input pulse train. It will be noted that during the foregoing interval, the duty cycle of the control pulse train is significantly greater than the 50% duty cycle that obtain when the circuit was in balance. Reference to FIG. 4 reveals that the duty cycle of the control pulse train remains at the same high level when the circuit has stabilized after the occurrence of the polarity reversal in the input pulse train.

As was the case depicted in FIG. 3, the gated reference signal prior to the polarity reversal is inverted because of the high level Q signal, whereas the gated reference signal subsequent to the polarity reversal is in phase with the reference signal. Thus because of the selective inversion of the reference signal by the OR gate 5, the duty cycle of the control pulse train and therefore the average level of the phase control signal applied to the oscillator 13 is not dependent upon the binary value of the transmitted signal.

Although the duty cycle of the control pulse train is temporarily reduced at the time of the polarity reversal, this transient condition has no significant effect on the average level of the phase control signal. However, as was the case with respect to the conditions of FIG. 3, in situations where this temporary disruption is to be reduced, the problem can be minimized by doubling the frequency of the reference pulse train.

When the high level phase control signal depicted in FIG. 4 is applied to the reference oscillator 13, the phase of the oscillator is temporarily altered until the reference pulse train is again in quadrature with the input pulse train at which time the circuit is in balance and the level of the phase control signal is again at its normal or balanced level.

It can be shown that if the reference signal is delayed rather than advanced as depicted in FIG. 4, the control signal pulse train will be altered so that a duty cycle of less than 50% is produced. The phase control signal will fall to a value less than its balanced level and the phase of the oscillator 13 will be altered so as to return the phase of the signal from this oscillator to its balanced or nominal level.

It will be appreciated that without the selective pulse inversion means of the present invention, the duty cycle of the phase control pulse train for the conditions depicted in FIG. 4 would be drastically altered when a polarity reversal occurred. Since this would seriously affect the average level of the d.c. phase control signal, such a system could not be tolerated in a biphase modulated signal environment.

As opposed to prior art demodulators designed for such applications, the circuit of the present invention is extremely simple. Basically, the circuit of the invention merely requires the addition of the flip-flop 17 and the exclusive OR gate 5 to a typical phase lock loop circuit.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A circuit for demodulating biphase modulated input signals comprising voltage controlled oscillator means for providing a reference signal having a nominal frequency equal to that of the input signal, sensing means for detecting the binary level of the input signal during a specified interval of each cycle of the reference signal, selective reference signal inverting means coupled to said sensing means for passing direct and inverted reference signals when said sensing means responds to input signals having high and low binary levels, respectively, gating means connected to receive said input signals and the signals from said inverting means, said gating means being constructed to provide a unipolar pulse train having a high level only when one but not both of the signals applied to the gating means is at a high level, filter means to apply a phase control signal representative of the average level of said pulse train to said voltage controlled oscillator, said filter means being adjusted to provide a phase control signal having a value that causes the oscillator to operate at said nominal frequency when the average level of the phase control signal is at a specified value, said reference oscillator being constructed so that deviations in the average level of the phase control signal cause the phase of the oscillator to shift towards its nominal value, and output means for providing modulation data output signals indicative of the response of said sensing means.

2. A circuit for demodulating a train of rectangular input pulses indicative of a received biphase modulated signal, said circuit comprising a voltage controlled reference oscillator for providing a rectangular pulse train having a nominal pulse rate and width equal to those of said input pulse train, sensing means for detecting the voltage level of the input pulse train at the inception of each reference pulse, said sensing means being constructed to provide a sustained modulation data output signal indicative of the detected voltage level until a voltage of the opposite value is detected at the inception of a subsequent reference pulse, first and second gating means each having a pair of input terminals, said first gating means being connected to receive said input pulses at one input terminal and the output of said second gating means at the other input terminal, said second gating means being connected to receive the output signal from said sensing means and said reference pulse train at its first and second input terminals, respectively, said second gating means being constructed to apply reference pulses directly to said first gating means when the sensing means output signal is at a first specified level and to invert the value of said reference pulses when the sensing means output signal is at a second specified level, said first gating means being operative to pass a signal only while a high level signal is applied to only one of its input terminals so as to provide a phase control pulse train having a variable duty cycle, filtering means for converting the phase control pulse train into a d.c. voltage having a magnitude dependent upon the duty cycle of the phase control pulse train, means to apply the d.c. voltage to said voltage controlled reference oscillator, said oscillator being adjusted to operate at its nominal phase when the d.c. voltage has a predetermined magnitude and to shift toward that nominal phase when the d.c. voltage deviates from said predetermined magnitude.

3. A circuit for demodulating a biphase modulated input pulse train comprising a voltage controlled reference oscillator for producing a train of reference pulses having a duration and repetition rate equal to that of the input pulse train when the circuit is in balance, a flip-flop for producing a sustained output voltage representative of the voltage level of the input pulse train at the inception of each reference pulse, first and second exclusive OR gates, said first OR gate being arranged to receive said input pulse train and the output signal from said second OR gate, said second OR gate being arranged to receive said sustained output signal and said reference pulse train so as to provide a gated reference signal to said first OR gate which has the same phase as the reference signal when the sustained signal is at a low level, but has the opposite phase when the sustained signal is at a high level, whereby said first OR gate provides a phase control pulse train having variable width pulses dependent upon the phase relationship between said input and gated reference pulse trains, means to convert said phase control pulse train into a d.c. voltage having a magnitude dependent upon the width of the pulses in that train, means to couple said d.c. voltage to said voltage control reference oscillator, said coupling means being constructed and arranged to maintain the oscillator in its balanced condition when the d.c. voltage has a predetermined magnitude and to restore the oscillator to the balance condition when the d.c. voltage level deviates from the predetermined value.

4. A phase locked loop circuit for demodulating an input signal consisting of a biphase modulated pulse train, said circuit comprising a voltage controlled oscillator for producing a reference pulse train having a nominal frequency equal to that of the input signal, sensing means for detecting the voltage level of the input signal at the inception of each reference pulse, said sensing means being operative to provide a sustained modulation data output signal until the sensing means responds to a change in input voltage level, first gating means responsive to said modulation data output signal and to said reference pulse train for producing a gated reference pulse train that is in phase with the reference pulse train when said output signal is at a first level and is 180° out of phase when the output signal is at a second level, second gating means responsive to said input and gated reference pulse trains for producing a phase control pulse train consisting of pulses that exit during such times that only one of said input and gated reference pulse trains is at a high level, filtering means to apply a d.c. control voltage indicative of the duty cycle of said control pulse train to said oscillator, said filtering means being constructed and arranged to maintain the oscillator phase at its nominal phase when the duty cycle is at a predetermined value and to restore the oscillator to the nominal phase whenever the duty cycle deviates from said predetermined value.

5. The circuit of claim 4 further characterized in that said sensing means is a D type flip-flop connected to receive said input signal at its D terminal and the reference pulse train at its clock terminal.

6. The circuit of claim 5 further characterized in that the modulation data output signal is taken from the Q output terminal of the flip-flop so that a high level sustained output signal is produced when the flip-flop is clocked while the input signal is at a high level.

7. The circuit of claim 6 still further characterized in that said first gating means is an exclusive OR gate whereby the reference pulse train is passed directly through the gating means when the modulation data output signal is at a low level, but the binary value of the individual pulses is inverted when the modulation data output signal is at a high level.

8. The circuit of claim 7 wherein said second gating means is an exclusive OR gate whereby the phase control pulse train consists of a series of unipolar variable width pulses.

* * * * *